United States Patent [19]

Niessel et al.

[11] 4,103,166

[45] Jul. 25, 1978

[54] METHOD AND APPARATUS FOR MONITORING THE OUTPUT OF A NEUTRON DETECTOR

[75] Inventors: John P. Niessel, San Jose; Walter K. Green, Gilroy; Yogeshwar Dayal, San Jose, all of Calif.

[73] Assignee: General Electric Company, San Jose, Calif.

[21] Appl. No.: 768,551

[22] Filed: Feb. 14, 1977

[51] Int. Cl.² ............................................. G01T 3/00
[52] U.S. Cl. .................................. 250/391; 250/375; 250/392
[58] Field of Search ............... 250/390, 391, 392, 374, 250/375, 388, 385; 176/19 R

[56] References Cited

U.S. PATENT DOCUMENTS

| 3,043,954 | 7/1962 | Boyd et al. | 250/385 |
| 3,565,760 | 2/1971 | Parkos et al. | 250/390 X |

*Primary Examiner*—Davis L. Willis
*Attorney, Agent, or Firm*—Ivor J. James, Jr.; Samuel E. Turner; Sam E. Laub

[57] ABSTRACT

A method and apparatus for monitoring the output of an ion chamber type in-core neutron detector is disclosed. Neutron detectors of this type are known to produce both alternating current and direct current signals which are used as measures of the neutron flux in the chamber. The monitor employs a ratio of the alternating current and direct current signals to detect ion chamber leaks, to correct the output of the detector after a leak, to predict the end-of-life of the detector and to determine the non-linearity of the detector at different power levels.

21 Claims, 4 Drawing Figures

METHOD AND APPARATUS FOR MONITORING THE OUTPUT OF A NEUTRON DETECTOR

BACKGROUND OF THE INVENTION

1. Field of the Invention

The invention is directed to a method and apparatus for monitoring the output of an ion chamber type neutron detector.

2. Description of the Prior Art

The invention relates to ion chamber type neutron detectors and systems thereof that are used to measure neutron flux in a nuclear reactor core. An example of an in-core detector system for measuring and monitoring the neutron flux in a nuclear reactor core with which the present invention may be employed is shown by G. R. Parkos et al., in U.S. Pat. No. 3,565,650.

Ion chamber type neutron detectors are well known and are shown, for example, by L. R. Boyd et al. in U.S. Pat. No. 3,043,954. Usually, such chambers comprise a pair of spaced electrodes electrically insulated from one another with a neutron sensitive material and an ionizable gas therebetween. For example, in a fission type ion chamber or fission chamber, the neutron sensitive material is a material such as U-235, which is fissionable by neutrons. As incident neutrons induce fissions of the uranium in the chamber the resultant fission products ionize the gas in proportion to the magnitude of the neutron flux in the chamber. Other types of neutron sensitive ion chambers employ a neutron sensitive material such as boron trifluoride in gaseous form. When a direct current voltage is applied across the electrodes of these ion chambers, an output current is created which is proportional to the amount of ionization and hence proportional to the neutron flux in the chamber.

It is well known that the neutron flux in the fission chamber may be determined by either measuring the average current flowing through the chamber to generate a signal, normally referred to as the DC signal, representative of the direct current flowing through the chamber, or by measuring the mean-square alternating current in the chamber in a suitable range of frequencies to generate a signal, normally referred to as the AC signal, representative of the alternating current flowing through the chamber. Either of these methods generate a signal which is used as a measure of the neutron flux in the chamber. Currently, in boiling water reactors, the direct current signal is used as a measure of neutron flux in the power range of the reactor and the alternating current signal is used as a measure of neutron flux at lower power levels.

As neutron detectors, fission chambers have the advantages of good sensitivity, adequate life and prompt response to changes in neutron flux. However, their response tends to be nonlinear and the output current versus neutron flux for any given chamber is not predictable with exactness. Furthermore, during use, the chambers must be recalibrated rather frequently because of loss of sensitivity due to burn-up of the neutron sensitive material or due to a change in the density of the ionizable gas in the chamber. In general, the operation of such fission chambers is easily impaired and malfunctions of various kinds can cause changes in sensitivity, the presence and magnitude of which may remain undetected until recalibration.

One of the weakest parts of a fission chamber is the seal between the chamber and the connecting cable. This seal contains the gas in the chamber and maintains a constant gas density in the chamber. When this seal fails, gas can flow either out of the chamber into the cable or out of the cable into the chamber depending on the gas pressures in those two regions at the time of the seal failure. In either case, the sensitivity of the chamber changes and the alternating current and direct current signals generated by the chamber become erroneous measures of neutron flux. Since this gas density change can occur over a period of time that can vary from a few minutes to several days depending on the degree of the failure, the erroneous reading may not be detected. In addition, if the erroneous reading is detected there is no way in which the size of the error can be determined other than by recalibrating the fission chamber. Thus, a need exists for a system which will detect a change in density of the gas in the ion chamber and measure the size of the error produced so that the output of the detector may be corrected automatically.

Another problem encountered with fission chamber neutron detectors is that gamma radiation will also ionize the gas in the chamber and produce a direct current signal proportional to gamma radiation in the chamber. There is no way to distinguish the neutron-produced portion from the gamma-produced portion of the direct current signal generated by the chamber. Thus, when the direct current signal is used as a measure of neutron flux, which is the method presently used in the power range of boiling water reactors, the fission chamber is considered to have reached end-of-life when the neutron produced current falls below a certain predetermined fraction of the total chamber current. However, there is presently no way to determine this event since the gamma exposure rate in the vicinity of the detector in the core of the reactor is not known and cannot accurately be measured. Thus, when the direct current signal is used as a measure of neutron flux, a need exists for a system which will measure the fraction of detector current that is being produced by neutron irradiation so that the end-of-life of the detector can be predicted.

Another problem encountered with fission chamber neutron detectors is that the chamber response is non-linear. That is, its output current is not strictly proportional to the neutron flux in the chamber. This non-linearity is due to reactor power induced temperature variations in the detector which result in power dependent variations in the gas density of the active volume of the detector. This results in detector sensitivity that is power dependent and hence a detector response that is non-linear. Since it is impossible to accurately measure neutron flux in the vicinity of a detector in the core of a nuclear reactor, the non-linearity cannot be determined and corrected in the conventional manner of measuring chamber output versus neutron flux in the range of neutron flux in which the chamber is to be used. Nevertheless, it is important to determine the detector non-linearity since the maximum power level at which a modern high power density reactor can be operated is a function of the non-linearity of its in-core detectors. Thus, a need exists for a system that determines the non-linearity of an ion chamber type neutron detector at various power levels.

Thus, it is an object of the present invention to provide a monitor for rapidly detecting a gas leak or a change in gas density in a fission chamber neutron detector.

It is another object of the invention to provide a monitor for correcting the output of a fission chamber neutron detector for changes in the density of the gas in the chamber.

It is another object of the invention to provide a monitor for measuring the neutron-produced fraction of the direct current signal generated in a fission chamber neutron detector so that the end-of-life of the detector may be predicted when the direct current signal is used as a measure of neutron flux.

It is another object of the invention to provide a monitor for determining the non-linearity of a fission chamber neutron detector at various power levels.

It is another object of the invention to substantially reduce or eliminate the number of times a fission chamber neutron detector needs to be recalibrated.

SUMMARY OF THE INVENTION

Briefly stated, these and other objects of the invention are carried out by providing a neutron detector monitor which employs a ratio of the alternating current and direct current signals generated by the fission chamber to detect changes in gas density in the chamber, to correct for changes in gas density, to predict the end-of-life of the detector when the direct current signal is used as a measure of neutron flux, and to determine detector non-linearity at various power levels.

According to the invention, a voltage, normally called the AC signal, proportional to the mean-square alternating current in the chamber is formed; a voltage, normally called the DC signal, proportional to the direct current in the chamber, is formed; a ratio of the AC and DC signals is formed and that ratio is monitored. Rapid changes in the ratio indicate a gas leak or a change in gas density in the chamber. A signal proportional to neutron flux in the chamber but independent of the gas density in the chamber is provided by dividing the DC signal by the ratio. Also, the AC signal generated by the detector is corrected by dividing the AC signal by the value of the ratio squared. The end-of-life of the chamber, when the direct current signal is used as a measure of neutron flux, is indicated when the ratio equals $M/(M+1)$ of the original value of the ratio, where the end-of-life of the chamber is defined as when the neutron-produced current becomes a predetermined multiple, M, of the gamma-produced current in the chamber. The DC sensitivity of the chamber at higher power levels, and thus the non-linearity of the chamber when the DC signal is used, is determined by multiplying the known DC sensitivity at a lower power level by the ratio of the AC and DC signals at the higher power level divided by the ratio of the AC and DC signals at the lower power level. The AC sensitivity of the chamber at higher power levels, and thus the non-linearity of the chamber when the AC signal is used, is determined by multiplying the known AC sensitivity at a lower power level by the square of the ratio of the AC and DC signals at the higher power level divided by the square of the ratio of the AC and DC signals at the lower power level.

DESCRIPTION OF THE PREFERRED EMBODIMENTS

Figure 1:
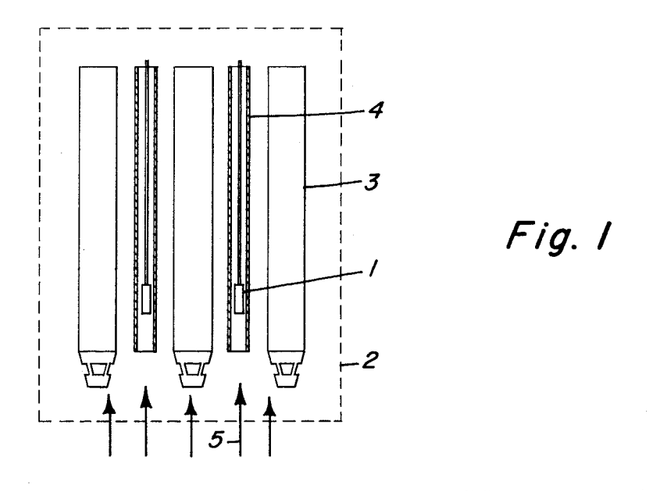
FIG. 1 is a schematic representation of a reactor core with in-core neutron detectors.

FIG. 1 schematically illustrates a plurality of detectors 1 positioned in a nuclear reactor core 2 to monitor the neutron flux therein. As is well known such a core comprises a plurality of spaced fuel assemblies 3 each containing a plurality of fuel elements or rods containing a fissionable material such as U-235. Protective tubes 4 are positioned in spaces between the fuel assemblies 3 to receive the detector units 1. A coolant, which is normally water, is circulated through the fuel assemblies to extract heat therefrom in the direction indicated by the arrows 5. The tubes 4 may be sealed or may be open as shown to receive a flow of coolant past the detector units. In practice a number of detector units are distributed in a predetermined arrangement in the core including several detector units at different core elevations in each tube 4 to provide an accurate indication of the magnitude and distribution of the neutron flux in the core as shown and described in greater detail in the aforementioned U.S. Pat. No. 3,565,760.

Figure 2:
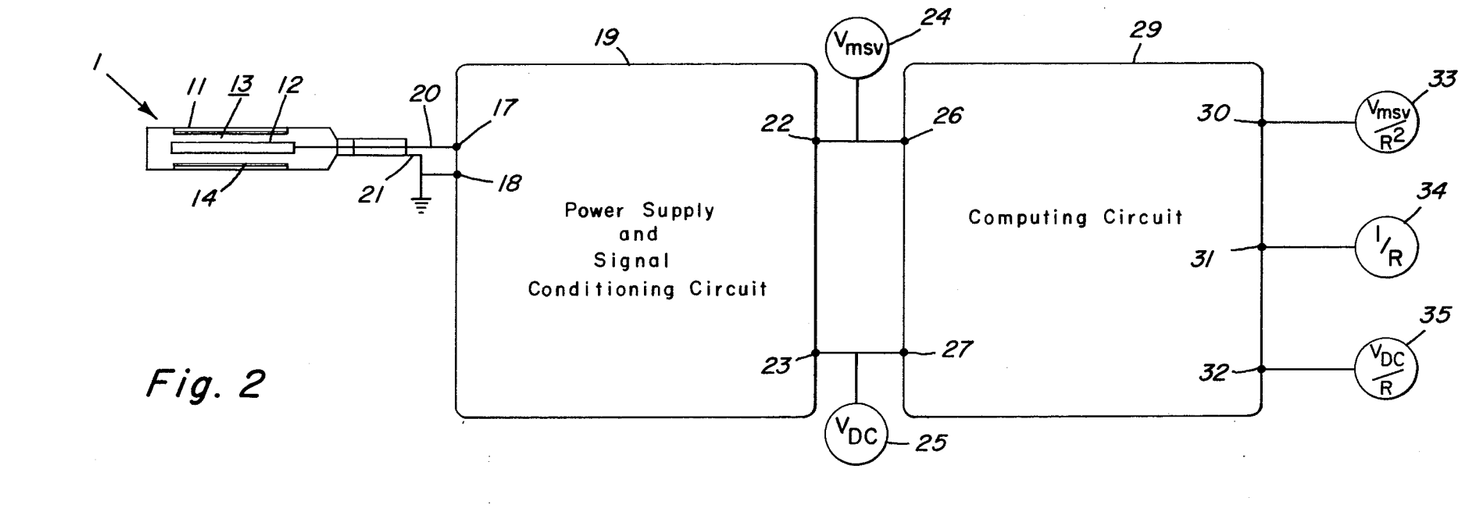
FIG. 2 is a block diagram of an electrical circuit embodying the invention.

A detector of the type which may be employed with the present invention is schematically illustrated in FIG. 2. The detector 1 includes two spaced conductive electrodes 11 and 12. The space or chamber 13 between the electrodes 11 and 12 is sealed and filled with an ionizable gas, for example, a noble gas such as argon. Carried on the surface of one or both of the electrodes 11 and 12 is a film, layer or coating 14 of a neutron activatable material, for example, fissionable uranium. In the presence of a neutron flux the coating 14 of fissionable material undergoes fission reactions at a rate proportional to the neutron flux. The resulting fission products cause ionization of the gas in the chamber between the electrodes in proportion to the number of fissions. A power supply of appropriate voltage connected between electrodes 11 and 12 results in collection of ion pairs by the electrodes. This will result in both an alternating and direct current flowing through the chamber which are both measures of the neutron flux in the chamber.

According to the method of the present invention a signal, $V_{MSV}$, normally referred to as the AC signal, proportional to the mean-square alternating current in the chamber is formed, and a signal, $V_{DC}$, normally referred to as the DC signal, proportional to the average current in the chamber is formed. The DC signal, $V_{DC}$, is directly proportional to the neutron flux in the chamber and the AC signal, $V_{MSV}$, is directly proportional to the neutron flux in the chamber. A ratio, R, of the $V_{MSV}$ and $V_{DC}$ signals is formed and the ratio R is monitored. A rapid change in R indicates a gas leak or change in gas density in the chamber. The signal $V_{DC}$ is corrected for changes in gas density in the chamber by dividing $V_{DC}$ by the ratio R. The signal $V_{MSV}$ is corrected for changes in the density of gas in the chamber by dividing $V_{MSV}$ by the square of the ratio R. The corrected $V_{DC}$ and $V_{MSV}$ signals are both representative to the neutron flux in the chamber independent of the gas density in the chamber. The end-of-life of the chamber, when the DC signal is used as a measure of neutron flux, is indicated when R equals $M/(M+1)$ of the original value of R, where the end-of-life of the chamber is defined as when the neutron-produced current becomes a predetermined multiple, M, of the gamma-produced current in the chamber. The DC sensitivity, $S_{DC}$, of the chamber at higher power levels, and thus the nonlinearity of the chamber at higher power levels, when the DC signal is used as a measure of neutron flux, is determined by multiplying the known DC sensitivity at a lower power level by R at the higher power level divided by R at the lower power level. The AC sensitivity, $S_{AC}$, of the chamber at higher power levels, and thus the non-linearity of the chamber at higher power levels when the AC signal is used as a measure of neutron flux, is determined by multiplying the known AC sensitivity at a lower power level by the square of R at the higher power level divided by the square of R at the lower power level. The method is best described in further detail in the following mathematical terms.

The average neutron-produced current flowing through the chamber is:

$$\overline{I}_n = r_n \overline{Q}_n, \tag{1}$$

where
$\overline{I}_n$ = average neutron-produced current,
$r_n$ = time rate of fissions occurring in the neutron-sensitive coating of the fission chamber, and
$\overline{Q}_n$ = average charge of one sign produced in the fission chamber gas per fission in the sensitive coating.

Similarly, the average gamma-produced current flowing through the chamber is:

$$\overline{I}_\gamma = r_\gamma \overline{Q}_\gamma, \tag{2}$$

where
$\overline{I}_\gamma$ = average gamma-produced current,
$r_\gamma$ = time rate of gamma interactions occurring in the chamber, and
$\overline{Q}_\gamma$ = average charge of one sign produced in the fission chamber gas per gamma interaction.

Hence, the total average current flowing through the chamber is:

$$\overline{I} = r_n \overline{Q}_n + r_\gamma \overline{Q}_\gamma. \tag{3}$$

This current is converted to a voltage, $V_{DC}$, proportional to the DC current in the chamber by suitable standard amplification circuitry. The output of this circuitry is:

$$V_{DC} = G(r_n \overline{Q}_n + r_\gamma \overline{Q}_\gamma), \tag{4}$$

where
$V_{DC}$ = amplified DC signal, or DC signal, and
$G$ = low-frequency transfer impedance of the electronic circuitry.

Note that Equation (4) can be written as:

$$V_{DC} = G(\overline{I}_n + \overline{I}_\gamma). \tag{5}$$

The mean-square alternating current per unit frequency interval flowing through the chamber is:

$$\overline{I^2} = k(r_n \overline{Q_n^2} + r_\gamma \overline{Q_\gamma^2}), \tag{6}$$

where
$\overline{I^2}$ = mean-square alternating current per unit frequency internal,
$k$ = a constant whose value depends on the frequency,
$\overline{Q_n^2}$ = mean-square charge of one sign produced in the fission chamber gas per fission in the sensitive coating, and $\overline{Q_\gamma^2}$ = mean-square charge of one sign produced in the fission chamber gas per gamma interaction.

Any practical fission chamber is designed so that the neutron-produced mean-square alternating current is much greater than the gamma-produced mean-square alternating current. Thus, it may be demonstrated that for any practical fission chamber:

$$r_n \overline{Q_n^2} >> r_\gamma \overline{Q_\gamma^2}, \tag{7}$$

so Equation (6) may be written as:

$$\overline{I^2} = k r_n \overline{Q_n^2}, \tag{8}$$

and Equation (8) is used as the mean-square alternating current flowing through the chamber. This current is converted to a voltage, $V_{MSV}$, by suitable standard amplification circuitry comprising an amplifier, band-pass filter, squaring circuit and low-pass RC filter. The output of this circuitry is:

$$V_{MSV} = r_n \overline{Q_n^2} A \int_0^\infty k[H]^2 df, \tag{9}$$

where:
$V_{MSV}$ = amplified MSV signal, or AC signal,
$A$ = low-frequency transfer function of the squaring circuit of the circuitry,
$[H]$ = magnitude of the transfer function of the linear part of the electronic circuitry, and
$f$ = frequency.

The pass band of the linear part of the circuitry can be located in such a manner that the value of the constant $k$ is uniform throughout the pass band and will not change if the seal fails. Equation (9) can be written as:

$$V_{MSV} = F r_n \overline{Q_n^2}, \tag{10}$$

$$\text{where } F = Ak \int_0^\infty [H]^2 df. \tag{11}$$

Hence the ratio, R, of the AC signal to the DC signal is:

$$R = \frac{F r_n \overline{Q_n^2}}{G(r_n \overline{Q}_n + r_\gamma \overline{Q}_\gamma)}. \tag{12}$$

DETERMINATION OF THE END OF LIFE OF THE CHAMBER

The ratio R is employed for determining the end of life of the chamber when the DC signal is used as a measure of neutron flux. For this purpose equation (12) is written as:

$$R = \frac{F \overline{Q_n^2}}{G(\overline{Q}_n + \frac{r_\gamma}{r_n} \overline{Q}_\gamma)} \tag{13}$$

When the chamber is new, the neutron-produced current is much larger than the gamma-produced current, or:

$$r_n \overline{Q}_n >> r_\gamma \overline{Q}_\gamma, \tag{14}$$

and Equation (14) can be written as:

$$\bar{Q}_n >> r_\gamma/r_n \bar{Q}_\gamma, \quad (15)$$

Hence, Equation (13) can be written as:

$$R_1 = F\overline{Q_n^2}/G\bar{Q}_n, \quad (16)$$

where
$R_1$ = the ratio of the AC signal to the DC signal of a new chamber.

As the chamber ages with use the neutron sensitive material is depleted and the neutron-produced current diminishes relative to the gamma-produced current. Eventually the neutron-produced current becomes a small enough fraction of the total output of the chamber that the chamber output is no longer useful as a measure of neutron flux. Thus, the chamber is considered to have reached end-of-life when the neutron-produced current becomes a predetermined multiple, M, of the gamma-produced current; that is when:

$$r_n\bar{Q}_n = Mr_\gamma\bar{Q}_\gamma, \quad (17)$$

and Equation (17) can be written as:

$$r_\gamma/r_n \bar{Q}_\gamma = 1/M \bar{Q}_n. \quad (18)$$

combining Equations (13) and (18)

$$R_2 = \frac{F\overline{Q_n^2}}{G(\bar{Q}_n + \frac{1}{M} \bar{Q}_n)}, \quad (19)$$

where: $R_2$ = the ratio of the AC signal to the DC signal for a chamber at its end-of-life
and Equation (19) can be written as:

$$R_2 = \frac{F\overline{Q_n^2}}{G\bar{Q}_n(1 + \frac{1}{M})} \quad (20)$$

Combining Equations (16) and (20) yields:

$$R_2 = \frac{M R_1}{M + 1} \quad (21)$$

Equation (21) indicates that the end-of-life of the chamber, when the DC signal is used as a measure of neutron flux, is reached when the ratio of the AC to DC signals, $R_2$, becomes $M/(M+1)$ of its initial value, $R_1$.

Detection of Seal Failure

If the seal between the chamber and its connecting cable fails and the gas density in the active volume of the chamber changes from D to D' atoms or molecules per unit volume then the mean change per neutron event is given by:

$$\bar{Q}'_n = D'/D \bar{Q}_n, \quad (22)$$

where the (') designation is hereinafter used to indicate after a seal failure. The mean charge per gamma event is given by:

$$\bar{Q}'_\gamma = D'/D \bar{Q}_\gamma, \quad (23)$$

The mean square charge per neutron event is given by:

$$\overline{(Q'_n)^2} = \left(\frac{D'}{D}\right)^2 \overline{Q_n^2}, \quad (24)$$

and, employing Equation (12), the AC to DC signal ratio after a seal failure is given by:

$$R' = \frac{Fr_n\overline{(Q'_n)^2}}{G(r_n\bar{Q}'_n + r_\gamma\bar{Q}'_\gamma)}. \quad (25)$$

Substitution of Equations (22), (23), and (24) into Equation (25) yields $$R' = \frac{Fr_n\left(\frac{D'}{D}\right)^2 \overline{Q_n^2}}{G\left[r_n\left(\frac{D'}{D}\right)\bar{Q}_n + r_\gamma\frac{D'}{D}\bar{Q}_\gamma\right]}, \quad (26)$$

and Equations (12) and (26) can be combined to yield $$R' = D'/D\, R. \quad (27)$$

Equation (27) indicates that the AC to DC signal ratio after a seal failure, R', is a direct function of the ratio of the gas densities, D and D', before and after a seal failure, respectively. Thus, if the ratio R changes relatively rapidly (that is, over a period of time from a few minutes to a few days) a seal failure has occurred and is detected.

Correction of Signal After Seal Failure

If the DC signal is being used as a measure of the neutron flux, which is the method presently being used in the power range of boiling water reactors, its value after a seal failure is given by:

$$V'_{DC} = G(r_n\bar{Q}'_n + r_\gamma\bar{Q}'_\gamma), \quad (28)$$

and, using Equations (22) and (23), this can be written as:

$$V'_{DC} = G\frac{D'}{D} (r_n\bar{Q}_n + r_\gamma\bar{Q}_\gamma). \quad (29)$$

Combining Equations (4), (27), and (29) yields $$V_{DC} = \frac{R}{R'} V'_{DC}. \quad (30)$$

Equation (30) indicates that to restore the DC signal to its correct value the erroneous signal may be multiplied by R/R' or divided by R'R. Alternately, equation (30) may be written as:

$$\frac{V_{DC}}{R} = \frac{V'_{DC}}{R'} \quad (31)$$

Equation (31) indicates that the DC signal after a seal leak divided by the ratio of the AC to DC signals after a seal leak is equal to the DC signal before the seal leak divided by the ratio of the AC to DC signals before the seal leak. Thus, it may be preferable in some cases to continuously divide the DC signal by the ratio of the AC to DC signals and use that value as a measure of neutron flux independent of the gas density in the chamber.

If the AC signal is being used as a measure of the neutron flux, its value after a seal failure is given by:

$$V'_{MSV} = Fr_n \overline{(Q_n')^2}, \qquad (32)$$

and, using Equation (24), this can be written as:

$$V'_{MSV} = F\left(\frac{D'}{D}\right)^2 r_n \overline{Q_n^2}. \qquad (33)$$

Substituting Equations (10) and (27) into (33) yields:

$$V'_{MSV} = \left(\frac{R}{R'}\right)^2 V_{MSV}. \qquad (34)$$

Thus, to restore the amplified AC signal to its correct value, the erroneous signal may be multiplied by $(R/R')^2$ or divided by $(R'/R)^2$.

Alternately, equation (34) may be written as:

$$\frac{V_{MSV}}{R^2} = \frac{V'_{MSV}}{(R')^2} \qquad (35)$$

Equation (35) indicates that the AC signal after a seal leak divided by the square of the ratio of the AC to DC signals after the seal leak is equal to the AC signal before the leak divided by the square of the ratio of the AC to DC signals before the leak. Thus, it may be preferable in some cases to continuously divide the AC signal by the square of the ratio of the AC to DC signals to provide a signal proportional to neutron flux independent of the gas density in the chamber.

Correction for Detector Non-Linearity

For small changes in gas density in the active volume of the fission chamber, the average charge of one sign produced in the gas per fission in the sensitive coating, or per gamma interaction, is proportional to the gas density; that is:

$$\overline{Q}_n = k_1 \rho \qquad (36)$$

$$\overline{Q}_\gamma = k_2 \rho \qquad (37)$$

where $k_1$ and $k_2$ are proportionality constants and $\rho$ is the density of the gas in the active volume of the chamber. Similarly, the mean square charge of one sign produced in the gas per neutron event is proportional to the square of the gas density:

$$\overline{Q_n^2} = k_3 \rho^2 \qquad (38)$$

where $k_3$ is a proportionality constant. Combining Equations (36), (37) and (38) with Equation (13) produces:

$$R = \frac{Fk_3 \rho^2}{G\left(k_1 + \frac{r_\gamma k_2}{r_n}\right)\rho} \qquad (39)$$

This can be written as:

$$R = k_4 \rho \qquad (40)$$

where:

$$k_4 = \frac{Fk_3}{G(k_1 + \frac{r_\gamma}{r_n} k_2)} \qquad (41)$$

This last quantity, $k_4$, is a constant over periods of time in which $r_\gamma/r_n$ does not change appreciably. Thus, any change in R during this period is due to a change in the gas density in the active volume and the value of R can be used as a measure of the non-linearity of the detector due to changes of gas density in the active volume of the detector. If $S_{DC}(i)$ is the DC sensitivity of the detector, $\rho(i)$ is the density of gas in the active volume and $R(i)$ is the ratio of the AC to DC signals at a first power level; and $S_{DC}(j)$ is the DC sensitivity, $\rho(j)$ is the gas density in the active volume, and $R(j)$ is the ratio of the AC to DC signals at a second power level, during a period when $r_\gamma/r_n$ is constant, these DC sensitivities, densities and ratios may be related in the following manner:

$$\frac{S_{DC}(i)}{S_{DC}(j)} = \frac{\rho(i)}{\rho(j)} = \frac{R(i)}{R(j)} \qquad (42)$$

Equation (42) provides a method of determining the DC sensitivities at various power levels and thus the non-linearity of the detector at various power levels.

Similarly, if $S_{AC}(i)$ is the AC sensitivity of the detector at a first power level, and $S_{AC}(j)$ is the AC sensitivity at a second power level during a period when $r_\gamma/r_n$ is a constant, these AC sensitivities, densities and ratios may be related in the following manner:

$$\frac{S_{AC}(i)}{S_{AC}(j)} = \left(\frac{\rho(i)}{\rho(j)}\right)^2 = \left(\frac{R(i)}{R(j)}\right)^2 \qquad (43)$$

Equation (43) provides a method of determining the AC sensitivities at various power levels and thus the non-linearity of the detector at various power levels.

To determine non-linearity, R may be plotted as a function of the DC signal or the AC signal as a first approximation. This would assume that DC signal or the AC signal is a direct measure of neutron flux which is inaccurate to the extent that the detector is non-linear. Then by iteratively correcting the DC signal or AC signal for the detector non-linearity with equation (42) or (43), respectively, an accurate estimate of linearity can be obtained. This method is well suited for detectors with small systematic non-linearity and does not require a measurement of neutron flux which is the major difficulty in conventional methods of determining non-linearity.

This method may be implemented when the reactor is to be operated at several different power levels during a period of time in which $r_\gamma/r_n$ does not change appreciably. Such a period would occur during the normal start-up of the reactor. Since equation (42) may be written as:

$$S_{DC}(j) = S_{DC}(i) \frac{R(j)}{R(i)} \qquad (44)$$

the DC sensitivity of the detector at higher power levels may be determined by recording the ratio of the AC to DC signals at each power level and, knowing the DC sensitivity at the first power level from standard calibration techniques, the DC sensitivity at subsequent higher power levels may be iteratively calculated with equation (44).

It also follows that equation (43) may be written as:

$$S_{AC}(j) = S_{AC}(i) \left( \frac{R(j)}{R(i)} \right)^2 \quad (45)$$

Thus, the AC sensitivity of the detector at higher power levels may be determined by recording the ratio of the AC to DC signals at each power level and, knowing the AC sensitivity at the first power level from standard calibration techniques, the AC sensitivity at subsequent higher power levels may be calculated with equation (45).

IMPLEMENTATION OF THE METHOD

A block diagram of an electrical circuit for carrying out the method is illustrated in FIG. 2. The electrodes 11 and 12 of the detector 1 are connected to terminals 17 and 18 of a power supply and signal conditioning circuit 19 by lines 20 and 21, respectively. Line 21 is also connected to ground. The power supply and signal conditioning circuit 19 includes a direct current voltage source to provide the necessary potential for the detector 1, a circuit for separating the AC signal and the DC signal generated by neutron flux in the detector 1, and appropriate amplifying and conditioning circuits for the AC and DC signals. The separated and amplified AC and DC signals appear on output terminals 22 and 23, respectively, of the power supply and signal conditioning circuit 19. The output of terminal 22 is $V_{MSV}$ which is proportional to the mean-square alternating current flowing through the chamber 13 of the detector 1. The output of terminal 23 is $V_{DC}$ which is proportional to the direct current flowing through the chamber. Voltmeters, strip chart recorders, or the like, 24 and 25 may be connected to terminals 22 and 23 for providing a visual indication, or a record, of $V_{MSV}$ and $V_{DC}$, respectively.

Terminals 22 and 23 are also connected to terminals 26 and 27, respectively, of a computing circuit 29. The computing circuit 29 is any suitable type of computing circuit, analogue or digital, which will carry out the calculations of the method. The computing circuit 29 receives the AC and DC signals, computes the ratio, R, of the AC and DC signals, computes the square of the ratio, $R^2$, and forms corrected AC and DC signals, $V_{MSV}/R^2$, and, $V_{DC}/R$, respectively. Outputs of the computing circuit 29 appear on terminals 30, 31 and 32. The output of terminal 30 is $V_{MSV}/R^2$. The output of terminal 31 is 1/R. The output of terminals 32 is $V_{DC}/R$. Voltmeters, strip chart recorders, or the like, 33, 34 and 35 are connected to terminals 30, 31 and 32 for illustrating, or keeping a record, of each respective output. The signals appearing on voltmeters 24 and 25 are representative of the uncorrected AC and DC signals, respectively. These meters are for information only and may be deleted in some embodiments of the invention. The signal appearing at voltmeter 34 is representative of the ratio, R, of the AC and DC signals and this signal is used to detect ion chamber leaks to predict the end-of-life of the detector, when the DC signal is used as a measure of neutron flux, and to determine the non-linearity of the detector. The signals appearing on voltmeters 33 and 35 are representative of the corrected AC and DC signals, respectively. These corrected signals are independent of the gas density in the chamber and are normally used as a measure of the neutron flux in the reactor.

Figure 3:
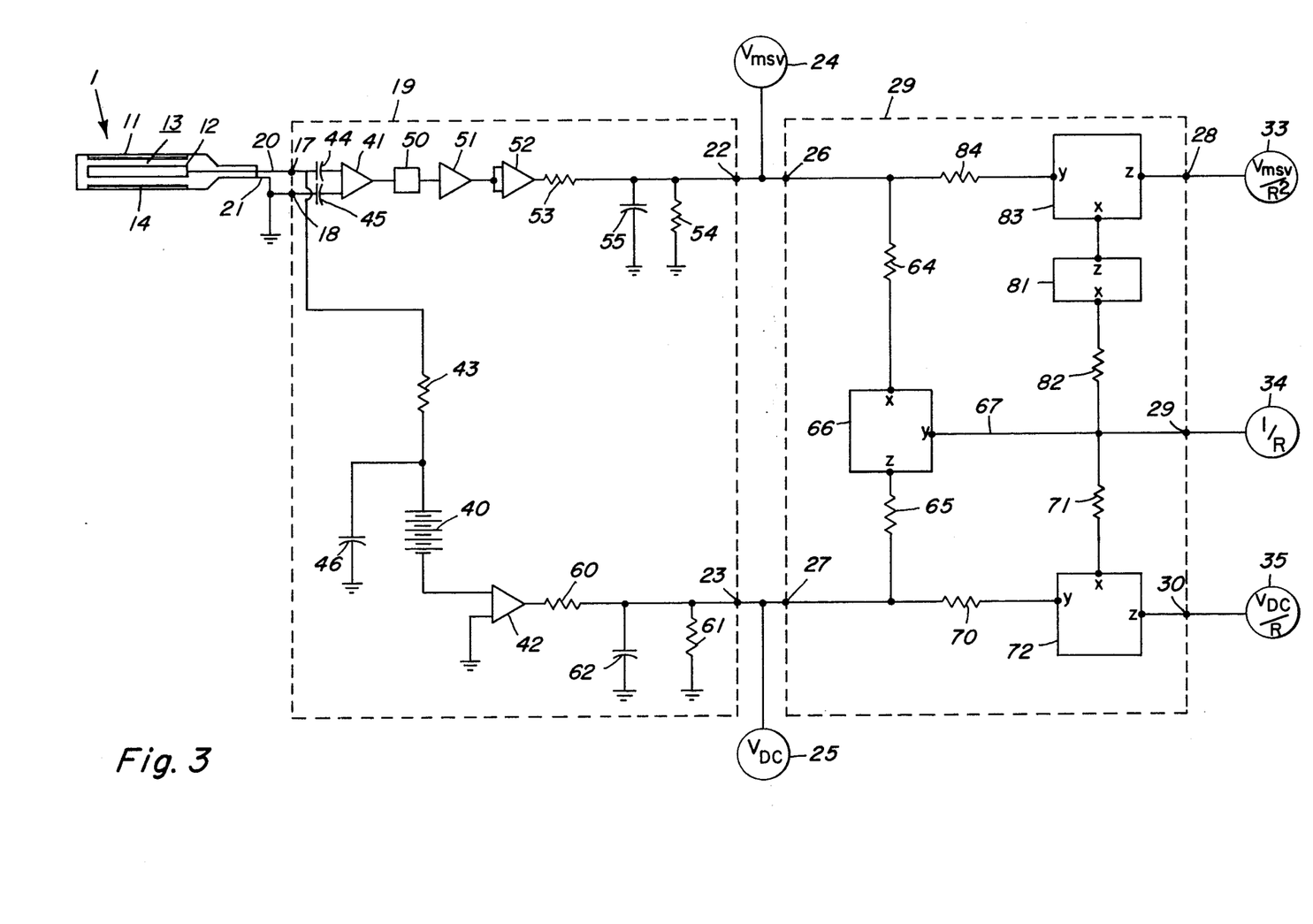
FIG. 3 is an electrical schematic of one embodiment of the invention.

Referring to FIG. 3 a specific circuit for carrying out the method is schematically illustrated. The circuit encompassed in the dotted lines 19 carries out the functions of the power supply and signal conditioning circuit 19 illustrated in block form in FIG. 2. The circuit encompassed in the dotted lines 29 is an analogue computing circuit carrying out the functions of computing circuit 29 illustrated in block form in FIG. 2. Other like components are given the same numeral designation in FIG. 3 as in FIG. 2.

The signal conditioning circuit illustrated in FIG. 3 includes means for providing a detector polarizing voltage here represented as a battery 40 although a conventional power supply that can be operated ungrounded is generally used. Differential amplifier 41 is the first amplifying stage of an AC signal conditioning circuit. Current amplifier 42 is the first amplifying stage of a DC signal conditioning circuit. The input of differential amplifier 41 is connected across the grounded and ungrounded electrodes of the detector 1. The source of polarizing voltage or power supply 40 is connected between the ungrounded electrode of the detector 1 and the input of current amplifier 42. A ballast resistor 43 of suitable value is connected between the power supply 40 and the ungrounded electrode of the detector 1. Capacitors 44 and 45 of suitable value are employed as a filter on the input of differential amplifier 41 for isolating the DC voltage from the AC signal conditioning circuit. A capacitor 46 of suitable value serves to bypass the AC signal around the power supply 40 and the DC signal conditioning circuit. An amplifier suitable for use as differential amplifier 41 is a Fairchild amplifier model number UA749C. An amplifier suitable to be used as current amplifier 42 is made by Analogue Devices, Inc. model number 506L.

The AC signal conditioning circuit further includes a bandpass filter 50, a voltage amplifier 51, a squaring circuit 52, and an RC circuit comprising resistors 53, 54 and a capacitor 55. The bandpass filter 50 is connected in series between the output of differential amplifier 41 and the input of voltage amplifier 51. The bandpass filter 50 is chosen to pass signals in a predetermined range of frequencies. The range of frequencies passed is a matter of choice since it is well known that the AC signal is most reliable in certain range of frequencies. The output of the bandpass filter 50 is supplied to voltage amplifier 51 which is the same type of amplifier as differential amplifier 41 except that it is connected as a voltage amplifier. The output of voltage amplifier 51 is supplied to a squaring circuit 52. The output of the squaring circuit 52 is connected to the RC circuit which serves to quiet and smooth out the signal. The RC circuit is employed because circuits used to measure neutron flux are noisy and subject to fluctuations. The time constant of the RC circuit is chosen according to how the monitor is used. If the monitor is primarily used for determining detector nonlinearity and the accuracy of the reading is particularly important, an RC circuit with a long time constant is chosen. Where the circuit is being used to calculate reactor power and a rapid indication of neutron flux is desirable an RC circuit having a lower time constant is desirable. A bandpass filter suitable for use at 50 is made by T. T. Electronics, Inc. model number K8777-B. A squaring circuit suitable for use at 52 is made by Analogue Devices, Inc. multiplying circuit model number 429B.

The DC signal conditioning circuit is comprised of current amplifier 42 and an RC circuit comprising resistors 60, 61 and a capacitor 62. Amplifier 42 is connected to power supply 40 an ground as a current amplifier. The output of current amplifier 42 is connected to the RC circuit of the DC signal conditioning circuit. The time constant of the RC circuit of the DC signal conditioning circuit is chosen according to the same considerations discussed above. However, once a time constant is chosen both RC circuits are given the same time constant since it is necessary to provide AC and DC signals representative of the neutron flux in the detector at the same point in time.

Terminals 22 and 23 of the signal conditioning circuit 19 are connected to terminals 26 and 27 of the computing circuit 29. The AC and DC signals are thus simultaneously supplied through resistors 64 and 65 to the X and Z terminals, respectively, of a dividing circuit 66. The resistors 64 and 65 are provided only for matching the level of the AC and DC signals to the input level of dividing circuit 66. The dividing circuit 66 may be of any suitable type wherein the output at terminal Y is proportional to the voltage at terminal Z divided by the voltage at terminal X. Thus the voltage on line 67, which is connected to terminal Y, is equal to 1/R where R is the ratio of the AC signal to the DC signal produced by the detector 1. A DC voltmeter, strip chart recorder, or the like, at 34 connected to line 67 through terminal 29 is used to indicate this 1/R signal. A gradual increase in the reading of the meter 34 to (M + 1)/M of its original value indicates that the detector has reached its end-of-life, when the DC signal is used as a measure of neutron flux. A sudden change in the signal indicated by the meter 34 will immediately indicate a change in gas density in the chamber which is ususally caused by a seal leak. Knowing the DC and AC sensitivities of the detector at lower power levels, the signal indicated by meter 34 is used to calculate the AC and DC sensitivities, and thus the non-linearity of the detector, at higher power levels.

The DC signal from terminal 27 and the 1/R signal from line 67 are supplied through resistors 70 and 71 to the Y and X terminals, respectively, of a multiplying circuit 72. Resistors 70 and 71 are provided only to match the signals to the input levels of the multiplying circuit 72. The multiplying circuit 72 is of any suitable type wherein the voltage at terminal Z is proportional to the product of the voltages at terminals X and Y. Thus the voltage at terminal Z is $V_{DC}/R$. A DC voltmeter, strip chart recorder or the like at 35 indicates $V_{DC}/R$. This signal is proportional to the neutron flux in the chamber 13 of detector 1 independent of the gas density in the chamber.

The 1/R signal from line 67 is also supplied to terminal X of a squaring circuit 81 through resistor 82. The resistor 82 is provided to match the 1/R signal to the input level of squaring circuit 81. The squaring circuit 81 is of any suitable type wherein the voltage at terminal Z is proportional to the square of the voltage at terminal X. Thus the voltage at terminal Z is proportional to $1/R^2$. This $1/R^2$ signal from the squaring circuit 81 and the AC signal from terminal 26 are supplied to a multiplying circuit 83. Terminal Z of the squaring circuit 81 is connected to the terminal X of the multiplying circuit 83. The AC signal from terminal 26 is supplied to the Y terminal of multiplying circuit 83 through resistor 84 chosen to match the AC signal to the level of the input of multiplying circuit 83. The multiplying circuit 83 is of any suitable type wherein the voltage at terminal Z is proportional to the product of the voltages at terminal X and Y. Thus the output at terminal Z, which is indicated on a DC volt meter, strip chart recorder, or the like, at 33 is $V_{MSV}/R^2$. This $V_{MSV}/R^2$ signal is representative of the neutron flux in the chamber 13 of detector 1 independent of the gas density in the chamber.

A voltage dividing circuit suitable for use as divider 66 is manufactured by Analogue Devices, Inc. model number $436_B$. circuit suitable for use as multiplying circuit 72, squaring circuit 81 and multiplying circuit 83 is manufactured by Analogue Devices, Inc. multiplier model number 435k.

Figure 4:
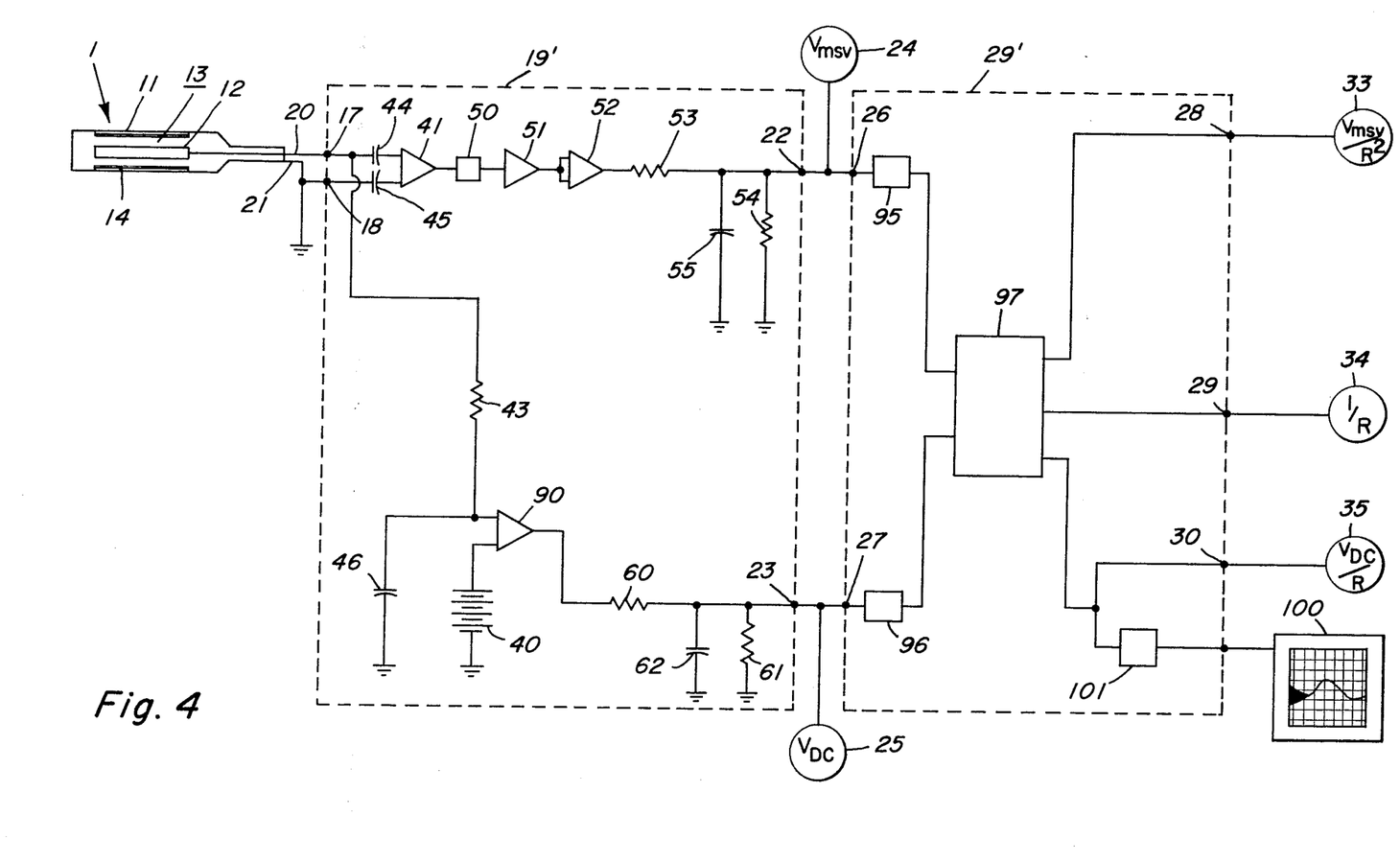
FIG. 4 is an electrical schematic of another embodiment of the invention.

Referring now to FIG. 4 an alternate embodiment of the invention is illustrated employing a modified signal conditioning circuit and a digital rather than an analogue computing circuit. Like components in FIGS. 3 and 4 are given the same numerical designation. The signal conditioning circuit is enclosed within the dotted lines indicated at 19'. The digital computing circuit is enclosed within the dotted lines indicated at 29'. The signal conditioning circuit of FIG. 4 differs from that of FIG. 3 in that amplifier 42 of FIG. 3 has been replaced by ungrounded amplifier 90 connected across the ungrouned electrode of the detector 1 an power supply 40. In this case the power supply 40 is grounded. This arrangement is particularly suitable when the monitor is to be switched between a plurality of detectors. The signal conditioning circuit of FIG. 3 is preferable when a monitor is to be used with only one detector. The signal conditioning circuits illustrated in FIGS. 3 and 4 are interchangeable and may be used alternately with the analogue or digital computing circuits illustrated in FIG. 3 and FIG. 4.

The digital computing circuit 29' illustrated in FIG. 4 is comprised of analogue to digital converters 95 and 96 and a programmable digital computer 97. Analogue to digital converter 95 receives the AC signal from terminal 26. Analogue to digital converter 96 receives the DC signal from terminal 27. Analogue to digital converters 95 and 96 transform the AC and DC signals, respectively, to digital form for input to digital computer 97. The digital computer 97 may be of any suitable type wherein the calculations of the method may be carried out. $V_{MSV}/R^2$, 1/R and $V_{DC}/R$ signals are supplied to terminals 28, 29 and 30 respectively. Digital meters 33, 34 and 35 provide a visual indication of $V_{MSV}/R^2$, 1/R and $V_{DC}/R$, respectively. If it is desirable to keep a permanent record of one of these values a strip chart recorder such as the one illustrated at 100 will be provided with a digital to analogue converter 101 for transforming the digital output of the computer 97 to the input requirements of the strip chart recorder 100. Analogue to digital converters suitable for use at 95 and 96 are manufactured by Analogue Devices, Inc. model number ADC-12QZ. A programmable digital computer suitable for use at 97 is manufactured by Intel, Inc. Digital Computer model number SBC 80/10. A digital to analogue converter suitable for use at 101 is manufactured by Analogue Devices, Inc. digital analogue converter model number DAC-12QM.

In either of the embodiments illustrated in FIG. 3 or 4 if a seal failure occurs, the ratio of the AC signal to the DC signal will change rather rapidly and the meter 34 will indicate this change since its reading is $V_{DC}/V_{MSV}$ or 1/R. Once a seal failure occurs the reading at meters 24 and 25 will become erroneous due to a change in sensitivity of the detector. However, the voltage indicated on meters 33 and 35 will not change since their values are proportional to $V_{MSV}/R^2$ and $V_{DC}/R$, respectively, which are independent of the gas density in the detector. The meter 34 is also used to indicate the end-of-life of the detector when the DC signal is used as a measure of neutron flux. The end-of-life of the detector is indicated when the reading of meter 34 is equal to (M + 1)/M of its original value. If the AC and DC sensitivities of the detector at a lower power level are known the sensitivities at higher power levels, and thus the non-linearity of the detector, may be calculated using equations (44) and (45) during a period when $r_\gamma/r_n$ is relatively constant. The meters 33 and 35 are normally used as a measure of neutron flux in the chamber 13 of the detector 1 independent of the gas density in the chamber. The corrected AC signal on meter 33 is normally used at low reactor power levels, and the corrected DC signal is normally used in the power range of the reactor. The meters 24 and 25 are provided for their general information value.

It should be noted that the ratio of the direct current signal to the alternating current signal could have been used in the calculations instead of the ratio of the alternating current signal to the direct current signal. The mathematical form of the result would be different but the principle would be the same.

These and other modifications of the apparatus and the method may be employed by those skilled in the art without departing from the invention and it is intended by appended claims to cover all of these modifications which fall within the proper scope of the invention.

What is claimed as new and desired to be secured by Letters Patent of the United States is:

1. A method for monitoring a neutron detector of the type having a chamber filled with an ionizable gas producing an alternating and a direct current both representative of the neutron flux in the chamber and a direct current representative of the gamma radiation in the chamber comprising the steps of:

forming an AC signal, $V_{MSV}$, proportional to the alternating current in said chamber, forming a DC signal, $V_{DC}$, proportional to the direct current in said chamber, forming a ratio, R, of said AC signal to said DC signal, and monitoring said ratio, to detect a change in gas density in said chamber.

2. The method of claim 1, further including the steps of:

forming a ratio, R', of said AC signal to said DC signal after a change in gas density has occurred, forming a signal, $V'_{DC}$, proportional to the direct current produced in said chamber after a change in gas density has occurred, and restoring $V'_{DC}$ to its correct value with the following relationship:

$$V_{DC} = R/R' \, V'_{DC}.$$

3. The method of claim 2, further including the steps of:

forming a signal, $V'_{MSV}$, proportional to the alternating current produced in said chamber after a change in gas density has occurred, and restoring $V'_{MSV}$ to its correct value with the following relationship:

$$V_{MSV} = (R/R')^2 V'_{MSV}.$$

4. The method of claim 1, further including the step:

dividing the signal, $V_{DC}$, by the ratio, R, to form a signal, $V_{DC}/R$, that is representative of the neutron flux in said chamber independent of the gas density in said chamber.

5. The method of claim 1, further including the steps of:

squaring the ratio R, and dividing the signal, $V_{MSV}$, by the value of $R^2$ to form a signal, $V_{MSV}/R^2$, that is representative of the neutron flux in said chamber independent of the gas density in said chamber.

6. The method of claim 1, further including the steps of:

forming an initial ratio, $R_1$, of said AC signal to said DC signal, forming a second ratio, $R_2$, of said AC to said DC signal at a later time, and detecting the end-of-life of said chamber when said DC signal is used as a measure of neutron flux, the end-of-life being detected when the following relationship occurs:

$$R_2 = R_1 M/M+1$$

where M is a predetermined multiple representing the ratio of the neutron-produced current to the gamma-produced current in said chamber at the end-of-life.

7. The method of claim 1, further including the steps of:

forming a ratio, R(i), of said AC signal to said DC signal at a low power level, determining the DC sensitivity, $S_{DC}(i)$, of said chamber at said low power level, forming a second ratio, R(j), of said AC signal to said DC signal at a higher power level, and determining the DC sensitivity, $S_{DC}(j)$, of said chamber at the higher power level by the following relationship:

$$S_{DC}(j) = R(j)/R(i) \, S_{DC}(i).$$

8. The method of claim 1, further including the steps of:

forming a ratio, R(i), of said AC signal to said DC signal at a low power level, determining the AC sensitivity, $S_{AC}(i)$, of said chamber at said low power level, forming a second ratio, R(j), of said AC signal to said DC signal at a higher power level, and determining the AC sensitivity, $S_{AC}(j)$, of said chamber at the higher power level with the following relationship:

$$jAC(i) = \left(\frac{R(j)}{R(i)}\right)^2 S_{AC}(i).$$

9. A method for monitoring the output of a neutron detector for gas leaks, said detector being of the type having a chamber filled with an ionizable gas and producing both an alternating and a direct current representative of the neutron flux in the chamber comprising the steps of:

forming an AC signal, $V_{MSV}$, proportional to the alternating current in said chamber, forming a DC signal, $V_{DC}$, proportional to the direct current in said chamber, forming a ratio, R, of said AC signal to said DC signal, forming a ratio, R', of said AC signal to said DC signal after a change in gas density has occurred, forming a signal, $V'_{DC}$, proportional to the direct current in said chamber, after a change in gas density has occurred, and restoring $V'_{DC}$ to its correct value with the following relationship:

$$V_{DC} = R/R' \, V'_{DC}$$

10. A method for monitoring the output of a neutron detector for gas leaks, said detector being of the type having a chamber filled with an ionizable gas and producing both an alternating and a direct current representative of the neutron flux in the chamber comprising the steps of:

forming an AC signal, $V_{MSV}$, proportional to the alternating current in said chamber, forming a DC signal, $V_{DC}$, proportional to the direct current in said chamber forming a ratio R of said AC signal to said DC signal, forming a ratio, R', of said AC signal to said DC signal after a change in gas density has occurred, forming a signal, $V'_{MSV}$ proportional to the alternating current in said chamber after a change in gas density has occurred, and restoring $V'_{MSV}$ to its correct value with the following relationship:

$$V_{MSV} = \left(\frac{R}{R'}\right)^2 V'_{MSV}. \tag{34}$$

11. A method for predicting the end-of-life of a neutron detector of the type having a chamber filled with an ionizable gas and producing an alternating and a direct current both representative of the neutron flux in the chamber and a direct current representative of the gamma radiation in said chamber, when the DC signal is used as a measure of neutron flux, comprising the steps of:

forming an AC signal proportional to the alternating current in said chamber, forming a DC signal proportional to the direct current in said chamber, forming an initial ratio, $R_1$, of said AC signal to said DC signal, and forming a second ratio, $R_2$, of said AC signal to said DC signal at a later time, and detecting the end-of-life of said chamber when said DC signal is used as a measure of neutron flux, the end-of-life being detected when the following relationship occurs:

$$R_2 = R_1 M/M+1$$

where M is a predetermined multiple representing the ratio of the neutron-produced current in said chamber at the end-of-life.

12. A method for determining the DC sensitivity, $S_{DC}$, and correcting for the non-linearity of a neutron detector at different power levels, said detector being of the type having a chamber filled with an ionizable gas and producing both an alternating and a direct current representative of the neutron flux in the chamber comprising the steps of:

forming an AC signal proportional to the alternating current in said chamber, forming a DC signal proportional to the direct current in said chamber, forming a ratio, R(i), of said AC signal to said DC signal at a low power level, determining the DC sensitivity, $S_{DC}(i)$ of said chamber at said low power level, forming a ratio, R(j), of said AC signal to said DC signal at a higher power level, and determining the DC sensitivity, $S_{DC}(j)$, of the chamber at the higher power level by the following relationship:

$$S_{DC}(j) = R(j)/R(i) \, S_{DC}(i).$$

13. A method for determining the AC sensitivity, $S_{AC}$, and correcting for the non-linearity of a neutron detector at different power levels, said detector being of the type having a chamber filled with an ionizable gas and producing both an alternating and a direct current representative of the neutron flux in the chamber comprising the steps of:

forming an AC signal proportional to the alternating current in said chamber, forming a DC signal proportional to the direct current in said chamber, forming a ratio, R(i), of said AC signal to said DC signal at a low power level, determining the AC sensitivity, $S_{AC}(i)$ of said chamber at said low power level, forming a ratio, R(j), of said AC signal to said DC signal at a higher power level, and determining the AC sensitivity, $S_{AC}(j)$, of the chamber at the higher power level by the following relationship:

$$jAC(i) = \left(\frac{R(j)}{R(i)}\right)^2 S_{AC}(i).$$

14. The method of claim 13 further including the steps of:

forming a ratio, R', of said AC signal to DC signal after a change in gas density has occurred, forming a signal, $V'_{DC}$, proportional to the direct current produced in said chamber after a change in gas density has occurred, restoring $V'_{DC}$ to its correct value with the following relationship:

$$V_{DC} = R/R' \, V'_{DC}$$

forming a signal, $V'_{MSV}$, proportional to the alternating current produced in said chamber after a change in gas density has occurred, restoring $V'_{MSV}$ to its correct value with the following relationship:

$$V_{MSV} = (R/R')^2 V'_{MSV}$$

forming an initial ratio, $R_1$, of said AC signal to said DC signal, forming a second ratio, $R_2$, of said AC signal to said DC signal at a later time, detecting the end-of-life of said chamber when said DC signal is used as a measure of neutron flux, the end-of-life being detected when the following relationship occurs:

$$R_2 = R_1 M/M+1$$

where M is a predetermined multiple representing the ratio of the neutron-produced current to the gamma-produced current at the end-of-life, forming a ratio, $R(i)$, of said AC signal to said DC signal at a low power level, determining the DC sensitivity, $S_{DC}(i)$, of said chamber at said low power level, forming a ratio, $R(j)$, of said AC signal to said DC signal at a higher power level, determining the DC sensitivity, $S_{DC}(j)$ of said chamber at the higher power level by the following relationship:

$$S_{DC}(j) = R(j)/R(i) \, S_{DC}(i)$$

determining the AC sensitivity, $S_{AC}(i)$, of said chamber at said low power level, and determining the AC sensitivity, $S_{AC}(j)$, of said chamber at the higher power level by the following relationship:

$$jAC(i) = \left(\frac{R(j)}{R(i)}\right)^2 S_{AC}(i).$$

15. A neutron detector monitor for the type of neutron detector having a chamber filled with an ionizable gas producing an alternating current and a direct current both representative of the neutron flux in said chamber and a direct current representative of the gamma radiation in said chamber comprising:

means connected to said detector for separating said alternating and direct current and producing a signal, $V_{MSV}$, proportional to the alternating current in said chamber and a signal, $V_{DC}$, proportional to the direct current in said chamber, means for receiving said $V_{MSV}$ signal and said $V_{DC}$ signal and dividing said signals to provide an output signal, 1/R, where R is a ratio of said $V_{MSV}$ signal to said $V_{DC}$ signal, and means responsive to said 1/R signal, rapid changes in said 1/R signal indicating a change in the gas density in said chamber, the end-of-life of said chamber, when the DC signal is used as a measure of neutron flux, being indicated when said 1/R signal equals (M+1)/M of its original value, where M is a predetermined multiple representing a ratio of the neutron-produced current to the gamma-produced current at the end-of-life.

16. The neutron detector monitor of claim 15 wherein said means receiving said $V_{MSV}$ signal and said $V_{DC}$ signal is:

a programmable digital computer programmed to divide said signals and provide an output signal, 1/R, where R is a ratio of said $V_{MSV}$ signal to said $V_{DC}$ signal.

17. The neutron detector monitor of claim 16 wherein said digital computer is programmed to multiply said $V_{DC}$ signal by said 1/R signal to form a signal $V_{DC}/R$ representative of the neutron flux in said chamber independent of the gas density in said chamber.

18. The neutron detector monitor of claim 17 wherein said digital computer is programmed to form a signal $1/R^2$, and to multiply said $V_{MSV}$ signal by said $1/R^2$ signal to form a signal $V_{MSV}/R^2$ representative of the neutron flux in said chamber independent of the gas density in said chamber.

19. The neutron detector monitor of claim 15 wherein said means receiving said $V_{MSV}$ signal and said $V_{DC}$ signal is:

a dividing circuit having first and second input lines and an output line, means connected to said first input line to supply said signal $V_{DC}$ to said dividing circuit, means connected to said second input line to supply said signal $V_{MSV}$ to said dividing circuit, said dividing circuit providing on said output line a signal, 1/R, where R is a ratio of said $V_{MSV}$ signal to said $V_{DC}$ signal.

20. The neutron detector monitor of claim 19 further including:

a first multiplying circuit having first and second input lines and an output line, means connected to said first input line to supply said signal $V_{DC}$ to said multiplying circuit, means connected to said second input line to supply said signal 1/R to said multiplying circuit, said first multiplying circuit providing at said output line a signal $V_{DC}/R$ representative of the neutron flux in said chamber independent of the gas density in said chamber.

21. The neutron detector monitor of claim 20 further including:

a squaring circuit having an input line and an output line means connected to said input line to supply said signal 1/R to said squaring circuit, said squaring circuit providing at said output line a signal $1/R^2$, and a second multiplying circuit having first and second input lines and an output line, means connected to said first input line to supply said signal $V_{MSV}$ to said second multiplying circuit, means connected to said second input line to supply said signal $1/R^2$ to said second multiplying circuit, said second multiplying circuit providing at said output line a signal $V_{MSV}/R^2$ representative of the neutron flux in said chamber independent of the gas density in said chamber.

* * * * *